(12) United States Patent
Yamazaki et al.

(10) Patent No.: US 7,704,149 B2
(45) Date of Patent: Apr. 27, 2010

(54) FIXED TYPE CONSTANT VELOCITY JOINT

(75) Inventors: Kenta Yamazaki, Iwata (JP); Minoru Ishijima, Iwata (JP)

(73) Assignee: NTN Corporation, Osaka-fu (JP)

( * ) Notice: Subject to any disclaimer, the term of this patent is extended or adjusted under 35 U.S.C. 154(b) by 669 days.

(21) Appl. No.: 10/572,280

(22) PCT Filed: Sep. 27, 2004

(86) PCT No.: PCT/JP2004/014538

§ 371 (c)(1),
(2), (4) Date: Dec. 5, 2006

(87) PCT Pub. No.: WO2005/033538

PCT Pub. Date: Apr. 14, 2005

(65) Prior Publication Data

US 2008/0096678 A1    Apr. 24, 2008

(30) Foreign Application Priority Data

Oct. 1, 2003    (JP)    .............................. 2003-343173
Feb. 6, 2004    (JP)    .............................. 2004-031130

(51) Int. Cl.
*F16D 3/223*    (2006.01)
(52) U.S. Cl. ...................................... 464/145; 464/906
(58) Field of Classification Search ......... 464/140–146, 464/906
See application file for complete search history.

(56) References Cited

U.S. PATENT DOCUMENTS

| | | | | |
|---|---|---|---|---|
| 2,844,013 A | * | 7/1958 | Spence | 464/145 |
| 2,987,897 A | * | 6/1961 | Spence | 464/145 |
| 4,319,465 A | * | 3/1982 | Ito et al. | 464/145 |
| 4,358,282 A | * | 11/1982 | Yamamoto | 464/145 |
| 5,106,343 A | * | 4/1992 | Sakaguchi et al. | 464/906 |
| 5,616,081 A | * | 4/1997 | Krude et al. | 464/145 |
| 5,853,328 A | * | 12/1998 | Kobayashi et al. | 464/145 |
| 6,149,524 A |   | 11/2000 | Jacob | |
| 2003/0054893 A1 | * | 3/2003 | Thomas | 464/145 |

(Continued)

FOREIGN PATENT DOCUMENTS

GB    2 269 438    2/1994

(Continued)

*Primary Examiner*—Greg Binda
(74) *Attorney, Agent, or Firm*—Wenderoth, Lind & Ponack, L.L.P.

(57)    ABSTRACT

A fixed type constant velocity joint includes an outer ring (1), an inner ring (2), torque transmitting balls (3), a cage (4), and a pre loading mechanism in which either a pressing section for axially applying an elastic pressing force or a receiving section for receiving the pressing force from the pressing section is disposed in the cage (4), the other being disposed in the inner ring (2). The axial clearance between the inner ring (2) and the cage (4) is greater than the axial clearance which is due to the radial clearance of the track, and the axial clearance which is produced by the radial clearance of the track is 2.5-6.5 times as large as the radial clearance of the track. Further, the center of the outer spherical surface (2*b*) of the inner ring (2) is shifted to the spread side of the ball tracks (1*a*, 2*a*) over the center of the inner spherical surface (4*b*) of the cage, thereby improving the cross operation.

20 Claims, 14 Drawing Sheets

U.S. PATENT DOCUMENTS

2003/0083135 A1    5/2003    Yamazaki et al.

FOREIGN PATENT DOCUMENTS

| | | |
|---|---|---|
| JP | 57-73228 | 5/1982 |
| JP | 57-171427 | 10/1982 |
| JP | 62-39025 | 3/1987 |
| JP | 9-42304 | 2/1997 |
| JP | 09-291945 | 11/1997 |
| JP | 2003-130082 | 5/2003 |

* cited by examiner

FIXED TYPE CONSTANT VELOCITY JOINT

TECHNICAL FIELD

The present invention relates to a fixed type constant velocity joint which can be utilized in various steering devices including electric power steering devices and also in drive shafts, propeller shafts and other power transmission systems in automobiles and various industrial machines.

BACKGROUND ART

Generally, a plurality of Cardan joints (cross shaft couplings) have been used in an automobile steering device. The Cardan joint is a non-constant velocity joint which is such that when the working angle increases, the rotational variation between the input and output shafts also increases. Since it is necessary to secure constant velocity nature by combining a plurality of Cardan joints, there is a problem that the degree of freedom of design of vehicles is impaired.

Accordingly, if fixed type constant velocity joints are used as shaft couplings for steering devices, constant velocity nature can be secured at any working angle, providing the advantage of increasing the degree of freedom of design of vehicles. The fixed type constant velocity joint comprises an outer ring having a plurality of curved track grooves in its spherical inner surface, an inner ring having a plurality of curved track grooves in its spherical outer surface, torque transmitting balls incorporated between the track grooves of the inner and outer rings, and a cage for holding the torque transmitting balls.

The center of curvature of the track grooves of the outer ring (the outer ring track center) is offset with respect to the center of curvature of the spherical inner surface of the outer ring, and the center of curvature of the track grooves of the inner ring (the inner ring track center) is offset with respect to the center of curvature of the spherical outer surface of the inner ring, axially by the same distance to opposite sides, whereby the ball tracks constituted by the track grooves of the outer and inner rings are in the form of wedges spread toward the opening side of the outer ring.

In this connection, this kind of fixed type constant velocity joint has clearances created therein between the track grooves of the outer and inner rings and the balls because of the request made for functional and processing reasons. When either the inner ring and or the outer ring is fixed with the joint in the neutral position and the other is moved, such clearances appear as axial clearances, radial clearances or circumferential clearances. The track clearances greatly influence the circumferentially (rotation backlash) between the inner and outer rings. The track clearances are inevitable to the fixed type constant velocity joint from the standpoint of processing allowance and assemblability, resulting in large rotation backlash, causing the fear that such rotation backlash deteriorates the steering feel for substantially straight travel of the vehicle or is the cause of generation of abnormal sounds. To solve this problem, Japanese unexamined Patent publication 2003-130082 proposes a fixed type constant velocity joint capable of eliminating or suppressing the rotation backlash by closing the track clearances by a preloading means installed in the joint.

The fixed type constant velocity joint disclosed in Japanese unexamined Paten publication 2003-130082 has ball tracks in the form of wedges spread toward the opening side of the outer ring, and in order to close the axial clearances created by track clearances, it has an arrangement wherein a pressing section for axially applying elastic pressing force is provided on the inner ring side, while a receiving section for receiving the pressing force from the pressing section is provided in the cage. And, elastic abutment between the pressing section and the receiving section presses the inner ring toward the opening side of the outer ring, thus producing axial relative movement between the two. The relative movement closes the track clearances through the balls, thus preventing rotation backlash. Depending on the setting of the axial clearance defined by the spherical clearance between the inner ring and the cage and depending on the axial clearance produced by the track clearances, however, there are cases where the axial clearance produced by the track clearances cannot be closed completely, making it difficult to prevent rotation backlash.

SUMMARY OF THE INVENTION

According to an embodiment of the invention, a fixed type constant velocity joint comprises an outer member having an inner diameter surface formed with a plurality of track grooves, an inner member having an outer diameter surface formed with a plurality of track grooves, balls disposed in wedge-shaped ball tracks defined by the track grooves of the outer and inner members, a cage disposed between the inner diameter surface of the outer member and the outer diameter surface of the inner member for rotatably holding the balls, and a preloading mechanism in which either a pressing section for axially applying an elastic axial pressing force or a receiving section for receiving the pressing force from the pressing section is disposed in the cage, the other being disposed in the inner member, said fixed type constant velocity joint being characterized in that the axial clearance between said inner member and said cage is greater than the axial clearance which is due to the track clearances, with a situation included in which the joint takes a working angle, and in that the axial clearance between said inner member and said cage is 2.5-6.5 times as large as the radial clearance of the track.

In this fixed type constant velocity joint, if the axial clearance between the inner member and the cage is less than the axial clearance due to the radial clearance of the track, with a situation included in which the joint takes a working angle, the inner and the cage abut against each other before the axial clearance can be completely closed; thus, there is a limit to the closing of the axial clearance due to the radial clearance of the track. Therefore, it is necessary that the axial clearance between the inner member and the cage be greater than the axial clearance due to the track clearances, with a situation included in which the joint takes a working angle. And, in order to make more definite the axial clearance between the inner member and the cage, the axial clearance between the inner member and the cage should be 2.5-6.5 times as large as the radial clearance of the track. This ensures that elastic abutment between the pressing section and the receiving section presses the inner member toward the opening side of the outer member, thus producing axial relative movement between the two, so that the clearance in the direction of rotation of the track can be reliably closed through the balls.

Further, it is desirable that the outer diameter surface of the inner member be formed with a chamfered section serving as a relief which avoids interference with the inner diameter surface of the cage or that the inner diameter surface of the cage be shaped as an aspherical surface which suppresses interference with the outer diameter surface of the inner member. This can prevent interference between the cage and the inner member when the cage and the inner member are relatively moved.

According to the invention, elastic abutment between the pressing section and the receiving section of the preloading mechanism presses the inner member toward the opening side of the outer member, thus producing axial relative movement between the two, in which case the axial clearance between the inner member and the cage is made 2.5-6.5 times as large as the radial clearance of the track, so that the track clearances can be reliably closed through the balls without abutment between the inner member and the cage taking place before the axial clearance due to the track clearances can be completely closed. Thus, the occurrence of rotation backlash can be reliably prevented, making it possible to provide a fixed type constant velocity joint of high quality used as a steering shaft coupling for vehicles.

According to another embodiment of the invention, a fixed type constant velocity joint comprises an outer ring having an inner spherical surface formed with a plurality of track grooves, an inner ring having an outer spherical surface formed with a plurality of track grooves, wedge-shaped ball tracks each defined by an outer ring track groove and an inner ring track groove, which form a pair, and reduced in size from one end of the direction of the axis of the point to the other end, torque transmitting balls incorporated one in each ball track, and a cage having pockets for holding the torque transmitting balls and interposed between the inner spherical surface of the outer ring and the outer spherical surface of the inner ring, wherein the center of curvature of the track grooves of the outer ring and the center of curvature of the track grooves of the inner ring are offset from the center of the joint by the same distance to opposite sides, said fixed type constant velocity joint being characterized in that the axial central position of the pockets of the cage is shifted from the center of curvature of the cage to the center of curvature side of the track grooves of the outer ring.

Shifting the axial central position of the pockets of the cage to the outer ring opening side (the outer ring track center side) with respect to the centers of the inner and outer spherical surfaces of the cage results in the clearance between the inner ring and the cage on the outer ring innermost part side having added thereto the radial clearance and the amount of shift of the axial central position of the cage pockets. This added clearance makes it possible to avoid interference between the inner ring outer spherical surface and the cage inner spherical surface which is caused by the displacement, which is on the outer ring innermost part side (inner ring track center side), of the inner ring due to the fact that the cage is not positioned at ½ of the working angle, in the cross operation in the no-load state. Therefore, it is possible to provide a fixed type constant velocity joint which operates smoothly without a hitch even during the cross operation.

The amount of shift of the axial central position of the pockets is in such dimensional relation that enables the securement of the clearance between the inner ring and the cage necessary for closing the track clearances by preloading. Specifically, it is preferable that the amount of shift of the axial central position of the pockets be from 1.0% to 3.0% of the amount of offset of the track grooves. Said dimensional relation can secure a large clearance between the inner ring and the cage on the outer ring innermost part side, reliably avoiding interference between the inner ring and the cage during the cross operation, thus providing smooth and stabilized operability. If said amount of shift is too small, the inner ring and the cage interfere with each other on the outer ring innermost part side during the cross operation. Reversely, if it is too large, the inner ring and the cage interfere with each other during the no-load operation before the track grooves and the torque transmitting balls contact each other. Further, if the spherical surface clearance is made too large in advance, the amount of twist with torque loaded becomes large, a fact which is not preferable.

It is preferable that the difference between the axial dimension of the pockets of the cage and the diameter of the torque transmitting balls be in the range from 0 to 30 μm. While positive clearance setting is preferable for lowering the resistance value, too large clearance makes it impossible to suppress the behavior of the torque transmitting balls, resulting in a failure in smooth operation. Said range ensures stabilized rotation of the torque transmitting balls.

DETAILED DESCRIPTION OF PREFERRED EMBODIMENTS

Embodiments of the invention will now be described below with reference to the drawings. In addition, the Rzeppa type (BJ), which is a kind of fixed type constant velocity joint, will be taken as an example for description, but the invention is not limited thereto and is also applicable to the undercut free type (UJ).

Figure 1:
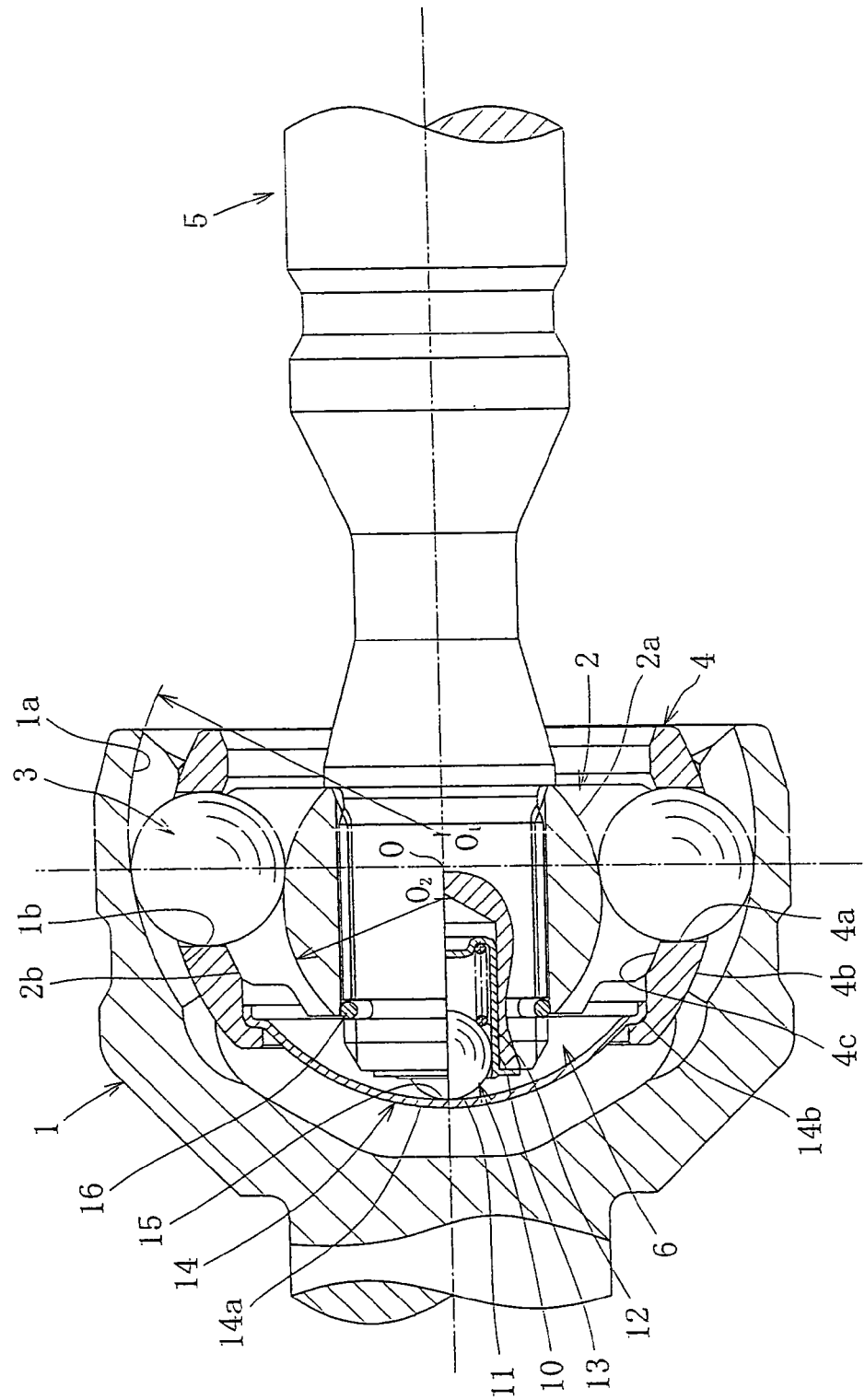
FIG. 1 is a longitudinal sectional view of a fixed type constant velocity joint, showing an embodiment of the invention.

The fixed type constant velocity joint, as shown in FIG. 1, has as its main structural elements an outer ring 1, an inner ring 2, a plurality of torque transmitting balls 3, and a cage 4. The outer ring 1 has an inner spherical surface 1b, which is formed with axially extending track grooves 1a. The inner ring 2 has an outer spherical surface 2b, which is formed with axially extending track grooves 2a. By connecting the inner ring 2 to a shaft 5 through a torque transmitting means such as serrations or splines, an inner member 6 is constituted by the inner ring 2 and the shaft 5. The track grooves 1a of the outer ring 1 and the track grooves 2a of the inner ring 2, which form pairs, constitute ball tracks, each ball track having a single torque transmitting ball 3 incorporated therein. The cage 4 is interposed between the inner spherical surface 1b of the outer ring 1 and the outer spherical surface 2b of the inner ring 2 and has circumferentially equispaced pockets 4a for receiving the torque transmitting balls 3.

The track grooves 1a and 2a are each 6 in number, for example, but in some cases they may be 3 or 8 each; they are not particularly limited in number. When seen in a longitudinal section (FIG. 1), the track grooves 1a and 2a are arcuate. The center of curvature $O_1$ of the track grooves 1a of the outer ring 1 (the outer ring track center) is offset with respect to the center of curvature O of the inner spherical surface of the outer ring 1, and the center of curvature $O_2$ of the track grooves 2a of the inner ring 2 (the inner ring track center) is offset with respect to the center of curvature O of the outer spherical surface 2b of the inner ring 2, axially by the same distance to opposite sides. Therefore, a ball track constituted by a pair of track grooves 1a and 2a is in the form of a wedge reduced in size from the opening side of the outer ring 1 toward the innermost part side.

The center of curvature of the inner spherical surface 1b of the outer ring 1 and the center of curvature of the outer spherical surface 4b of the cage 4 both coincide with the joint center O. Further, the center of curvature of the outer spherical surface 2b of the inner ring 2 and the center of curvature of the inner spherical surface 4c of the cage 4 also coincide with the joint center O. Therefore, the amount of offset of the outer ring track center $O_1$ is a distance from the joint center O to the outer ring track center $O_1$, while the amount of offset of the inner ring track center $O_2$ is a distance from the joint center O to the inner ring track center $O_2$; thus, the two distances are the same. In addition, although the centers of curvature of the outer spherical surface 4b and inner spherical surface 4c of the cage 4 are shown coinciding with the joint center O, these centers of curvature may be offset by the same distance to opposite sides with the joint center O therebetween as in the case of the track centers $O_1$ and $O_2$.

With this fixed type constant velocity joint, when the outer ring 1 and inner ring 2 each take a working angle, the torque transmitting balls 3 are maintained always in the bisection plane of any working angle, so that the constant velocity nature of the joint is secured.

Installed at the shaft end of the shaft 5 is a pressing member 10. The pressing member in the illustrated example is composed of a ball as a pressing section 11, a compression spring as an elastic member 12, and a case 13 for assembling the pressing section 11 and elastic member 12. The elastic member 12 acts as an elastic force through the pressing section 11. If the pressing section 11 is spherical at its contact with a receiving section 15, the shape of its remaining portion may be optional. The case 13 is fixed, by a suitable means such as press fitting or a binder, to the front end of the shaft 5 integrated with the inner joint member 2 by serration coupling.

A receiving member 14 is attached to the end of the outer ring innermost part side of the cage 4. This receiving member 14, which is in the form of a cover for covering the end opening on the outer ring innermost part side of the cage 4, is composed of a spherical surface 14a shaped as a partial spherical surface, and an attaching section 14b annularly formed around the outer periphery of the spherical surface 14a. The inner surface of the spherical surface 14a (the surface opposed to the shaft 5) is in the form of a concave surface, and this concave surface functions as the receiving section 15 receiving the pressing forced from the pressing section 11. The attaching section 14b is fixed to the end of the cage 4 by a suitable means such as press fitting or welding.

In addition, in this embodiment, the pressing section 11 is disposed on the inner ring side and the receiving section 15 is disposed on the cage side. However, it is possible to provide a structure in which, reversely, the pressing section is disposed on the cage side and the receiving section is disposed on the inner ring side.

In the above arrangement, when the inner ring 2 is fitted on the shaft 5 and the two are positioned by a stop ring 16 or the like, the pressing section 11 of the pressing member 10 and the receiving section 15 of the receiving member 14 abut against each other, thereby compressing the elastic member 12. This causes the inner member 6 (the shaft 5 and inner ring 2) to be pressed to the opening side of the outer ring 1, so that axial relative movement takes place between the two. This, when seen from the torque transmitting balls 3, means that the latter are pushed to the reduced sides of the ball tracks. Therefore, this relative movement closes the track clearances, eliminating the rotation backlash. Here, the elastic member 12, pressing section 11, and receiving section 15 constitute a preloading mechanism.

In this connection, in the fixed type constant velocity joint, for processing and functional reasons, apart from said track clearances, there are minute spherical surface clearances between the outer spherical surface 4b of the cage 4 and the inner spherical surface 1b of the outer ring 1 and between the inner spherical surface 4c of the cage 4 and the outer spherical surface 2b of the inner ring 2. Of these axial clearances due to the spherical surface clearances, if the axial clearance between the inner spherical surface 4c of the cage 4 and the outer spherical surface 2b of the inner ring 2 is less than the axial clearance due to the track clearances, the inner ring 2 and the cage 4 abut against each other before the axial clearance due to the track clearances can be completely closed; thus, since the axial movable range of the cage 4 relative to the inner ring 2 is reduced, the axial clearance due to the track clearances cannot be fully closed, showing that there is a limit thereto. Therefore, it is necessary that the axial clearance between the cage 4 and the inner ring 2 be greater than the axial clearance due to the track clearances, with a situation included in which the joint takes a working angle.

Accordingly, in order to make more definite the axial play between the inner ring 2 and the cage 4, the axial clearance between the inner ring 2 and the cage 4 should be set at 2.5-6.5 times as large as the radial clearance due to the track clearances. This magnification, that is, the range from 2.5 to 6.5 times is found from the axial distances from the joint center O to the outer ring track center $O_1$ and the inner ring track center O2 (track offset quantity) and from the track PCD. Here, the track PCD (pitch circle diameter) means the track groove center diameter of the outer ring 1 and the inner ring 2.

If the magnification of the axial clearance between the inner ring 2 and the cage 4 with respect to the radial clearance due to said track clearances is less than 2.5 times, it becomes difficult to secure the depth necessary for transmitting torque concerning the track grooves 1a and 2a of the outer ring 1 and the inner ring 2. Reversely, if it is greater than 6.5 times, when a working angle is taken between the input and output shafts of the constant velocity joint, this incurs degradation of the bending operability. Therefore, it is desirable that the axial clearance between the inner ring and the cage be set at 2.5 to 6.5 times of the radial clearance due to the track clearances.

Further, the outer spherical surface 2b of the inner ring 2 is formed with a chamfered section serving as a relief which avoids interference with the inner spherical surface 4c of the cage 4. Further, the inner spherical surface 4c of the cage 4 is shaped as an aspherical surface which suppresses interference with the outer spherical surface of the inner ring 2. This ensures smooth movement of the inner ring 2 relative to the cage 4, securing the amount of movement of the inner ring 2 due to preloading, thus making it possible to close the track clearances more reliably.

Figure 2:
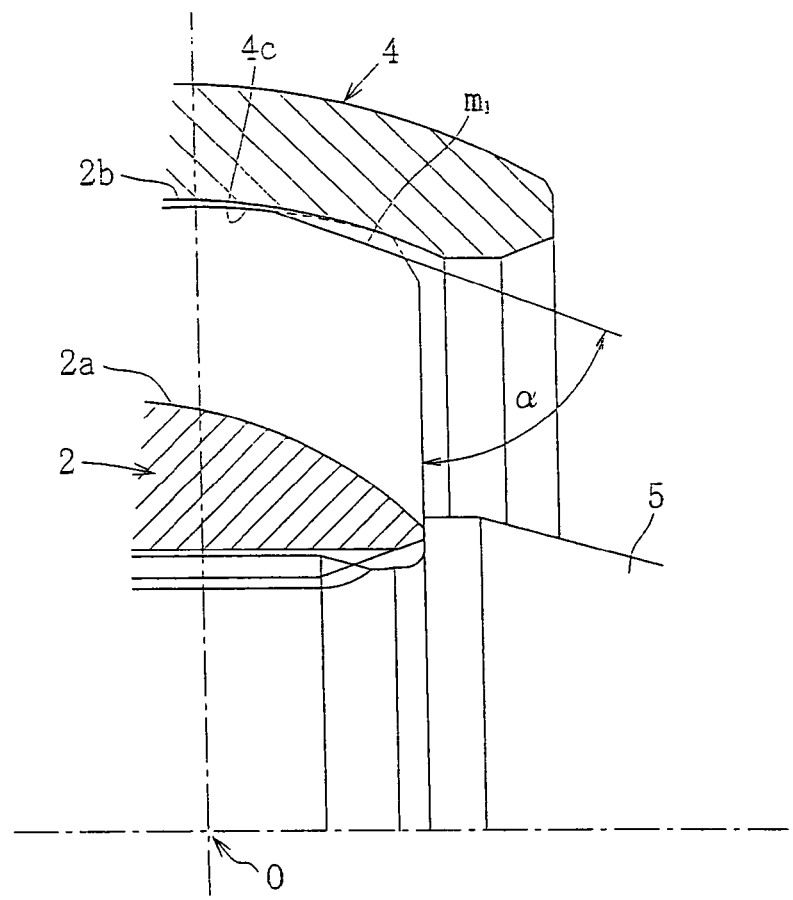
FIG. 2 is a partial enlarged view of the joint of FIG. 1.
Figure 3:
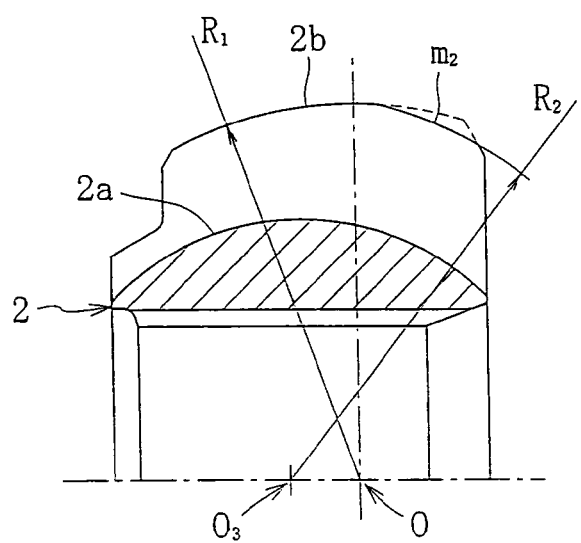
FIG. 3 is a longitudinal sectional view, showing a modification of the inner ring.
Figure 4:
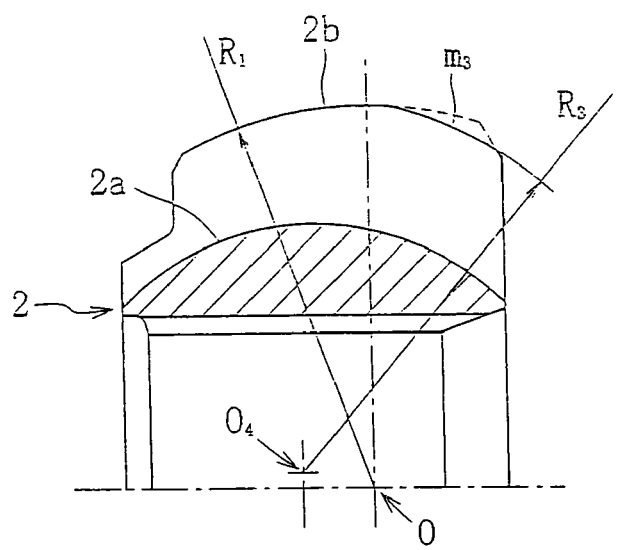
FIG. 4 is a longitudinal sectional view, showing a modification of the inner ring.
Figure 5:
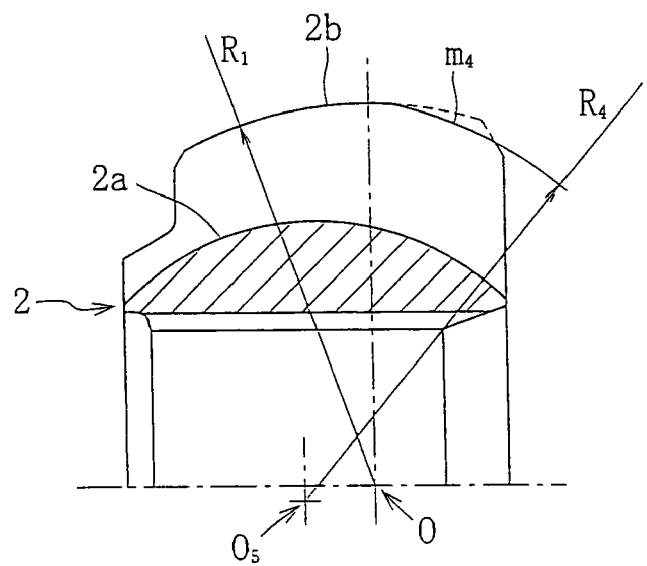
FIG. 5 is a longitudinal sectional view, showing a modification of the inner ring.
Figure 6:
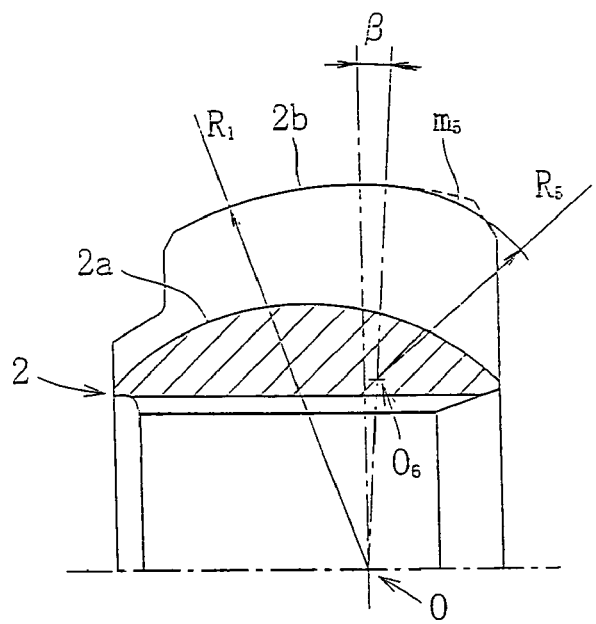
FIG. 6 is a longitudinal sectional view, showing a modification of the inner ring.
Figure 7:
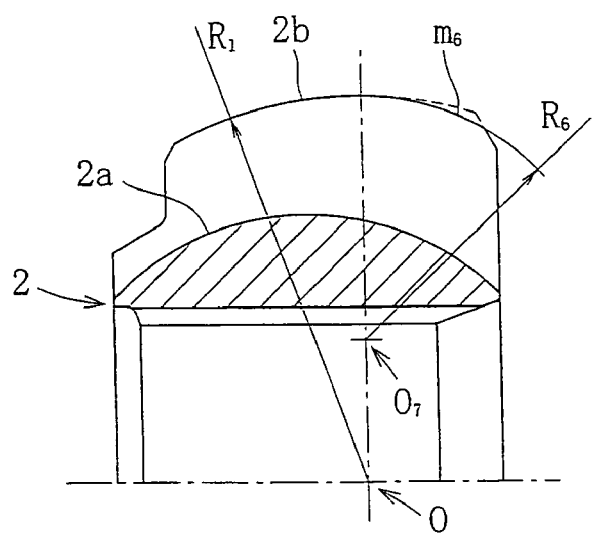
FIG. 7 is a longitudinal sectional view, showing a modification of the inner ring.

As to the mode of forming the chamfered section on the outer spherical surface 2b of the inner ring 2, various forms shown in FIGS. 2-7 may be contemplated. FIG. 2 shows a case where the end edge, which is on the outer ring opening side, of the outer spherical surface 2b of the inner ring 2 is formed with a tapered chamfered section m (the broken line portion in the illustration showing a conventional shape), and FIGS. 3-7 show cases where the end edge, which is on the outer ring opening side, of the outer spherical surface 2b of the inner ring 2 is formed with a chamfered section, as at $m_2$-$m_6$ (the broken line portion in the illustration showing a conventional shape), consisting of a curved surface having a center of curvature, as at $O_3$-$O_7$, which is offset axially or radially from the joint center O. The tapered chamfered section $m_1$ of FIG. 2 has a predetermined inclination angle α from the end surface of the inner ring 2. The chamfered sections $m_2$-$m_6$ of FIGS. 3 through 7 form convex surfaces having radii $R_2$-$R_6$ from the centers of curvature $O_3$-$O_7$, which are offset axially or radially from the joint center O (in FIG. 6, including the inclination angle β direction from the joint center O).

Figure 8:
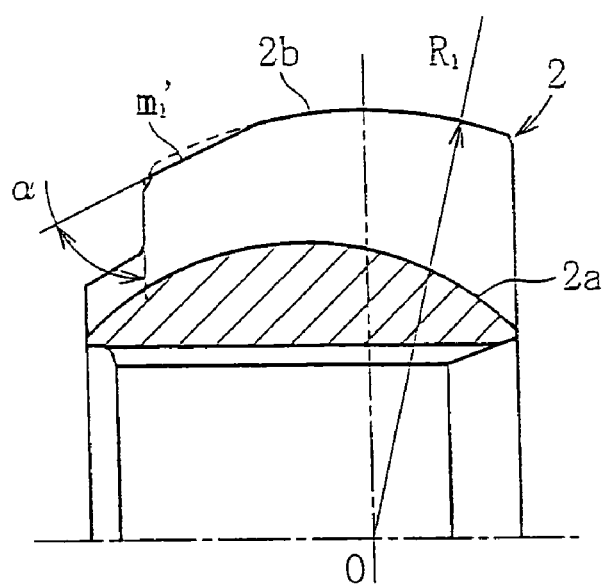
FIG. 8 is a longitudinal sectional view, showing a modification of the inner ring.
Figure 9:
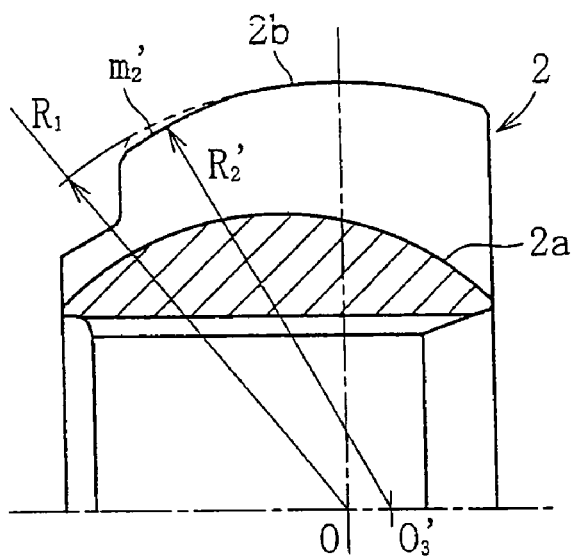
FIG. 9 is a longitudinal sectional view, showing a modification of the inner ring.
Figure 10:
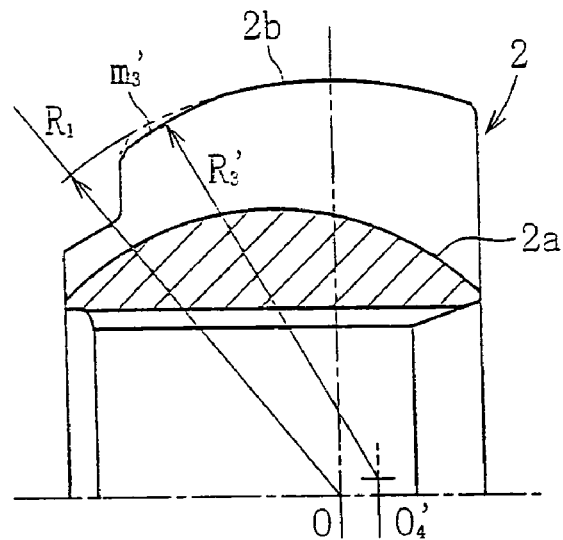
FIG. 10 is a longitudinal sectional view, showing a modification of the inner ring.
Figure 11:
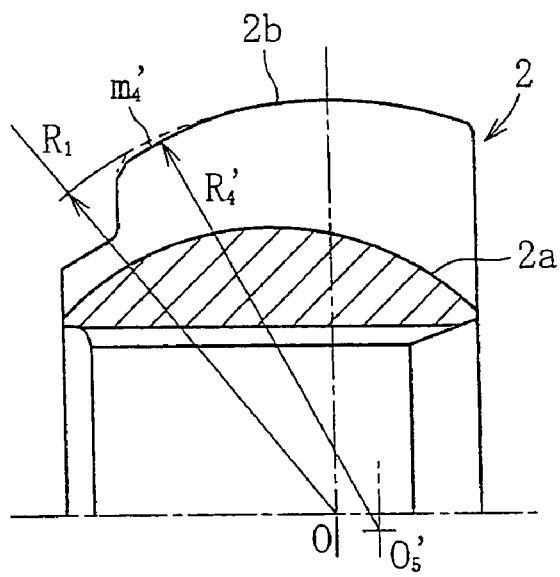
FIG. 11 is a longitudinal sectional view, showing a modification of the inner ring.
Figure 12:
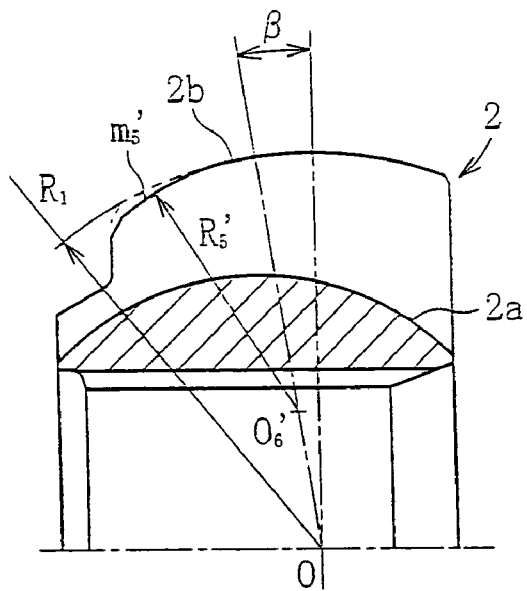
FIG. 12 is a longitudinal sectional view, showing a modification of the inner ring.
Figure 13:
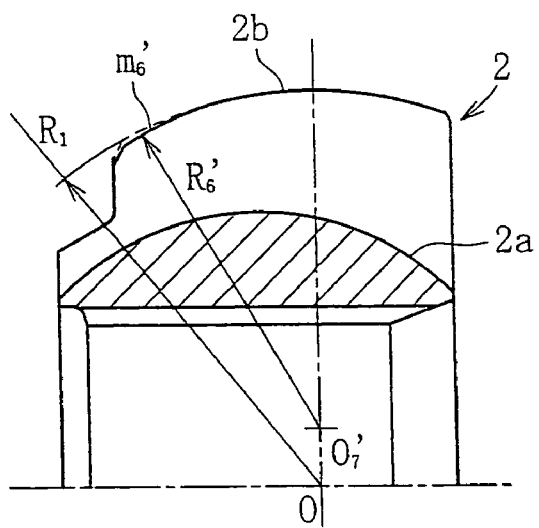
FIG. 13 is a longitudinal sectional view, showing a modification of the inner ring.

Whereas FIGS. 2 through 7 show the chamfered sections $m_1$-$m_6$ formed on the end edge, which is on the outer ring opening side, of the outer spherical surface 2b of the inner ring 2, it is also possible, as shown in FIGS. 8-13, to form chamfered sections $m_1$'-$m_6$' on the end edge, which is on the outer ring innermost part side, of the outer spherical surface 2b of the inner ring 2. FIG. 8 shows a case where the end edge, which is on the outer ring innermost part side, of the outer spherical surface 2b of the inner ring 2 is formed with a tapered chamfered section $m_1$'. FIGS. 9-13 show cases where the end edge, which is on the outer ring innermost part side, of the outer spherical surface 2b of the inner ring 2 is formed with a chamfered section, as at $m_2$'-$m_6$', consisting of a curved surface having a center of curvature, as at $O_3$'-$O_7$', which is offset axially or radially from the joint center O. The tapered chamfered section $m_1$' of FIG. 8 has a predetermined inclination angle α from the end surface of the inner ring 2. The chamfered sections $m_2$'-$m_6$' of FIGS. 9-13 form convex surfaces having radii $R_2$'-$R_6$' from the centers of curvature $O_3$'-$O_7$' which are offset from the joint center O axially or radially (in FIG. 12, including the direction of the inclination angle β from the joint center O).

Figure 14:
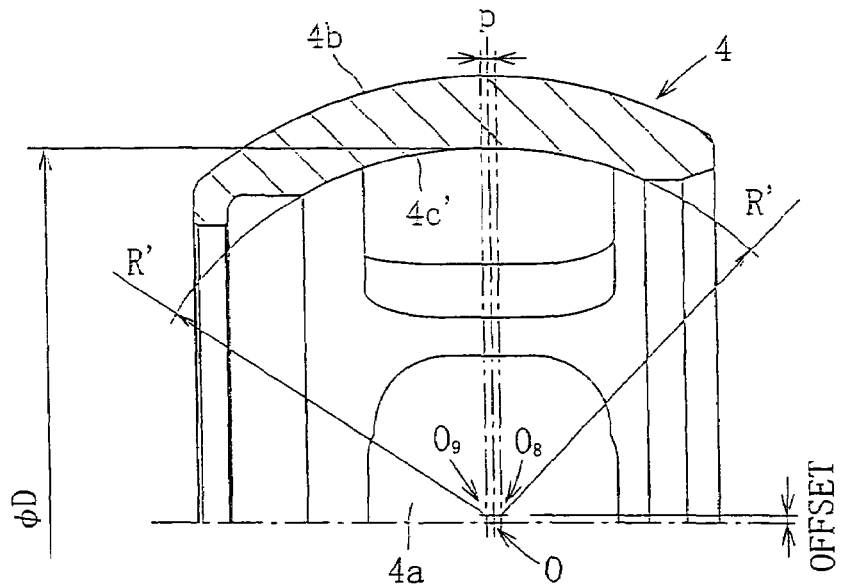
FIG. 14 is a longitudinal sectional view, showing a modification of the cage.
Figure 15:
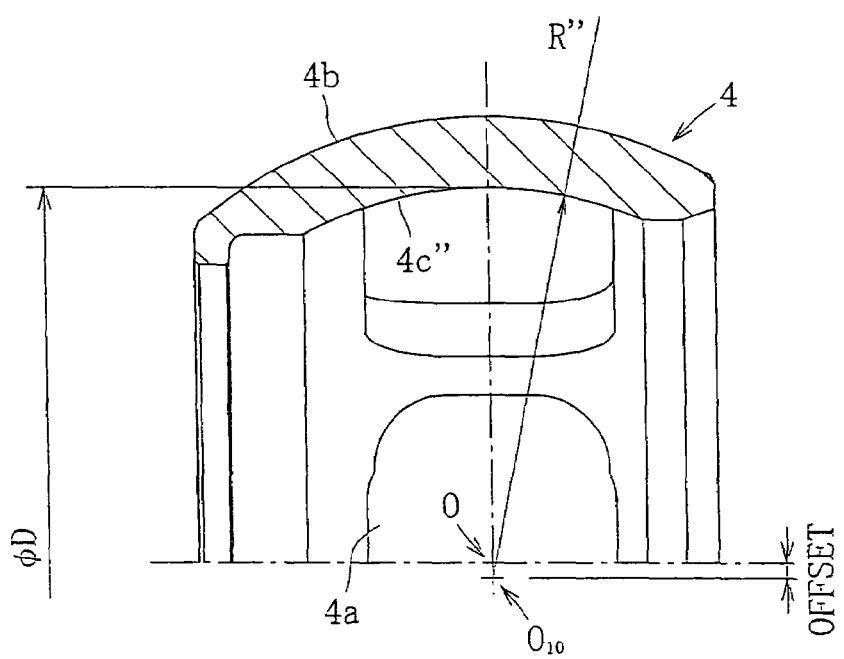
FIG. 15 is a longitudinal sectional view, showing a modification of the cage.

As to the mode of shaping the inner spherical surface 4c of the cage 4 as an aspherical surface which suppresses interference with the outer spherical surface of the inner ring 2, what are shown in FIGS. 14 and 15 may be contemplated. FIG. 14 shows a case where the joint center O portion of the inner spherical surface 4c' of the cage 4 is formed with a flat section p, whose opposite sides are in the form of concave surfaces of radius R' having centers of curvature $O_8$ and $O_9$ which are offset axially or radially from the joint center O, and FIG. 15 shows a case where the inner spherical surface 4c" of the cage 4 is in the form of a concave surface of radius R" having a center of curvature $O_{10}$ which is offset radially from the joint center O.

In the shape of the outer spherical surface 2b of the inner ring 2, the various forms of FIGS. 2-7 are combined with the various forms of FIGS. 8-13, whereby elastic abutment between the pressing section 11 and the receiving section 15 presses the inner ring 2 toward the opening side of the outer ring 1, thus producing an axial relative movement between the two. Thus, it becomes possible for the inner ring 2 to move axially until completion of closure of the track clearances without interference between the cage 4 and the inner ring 2 even when the joint has taken a working angle. Therefore, the track clearances are reliably closed and during the cross operation, for structural reasons, the torque transmitting balls 3 cannot stably control the cage 4 to the position of θ/2 deg, with the result that interference between the outer spherical surface 2b of the inner ring 2 and the inner spherical surface 4c of the cage 4 can be reliably avoided even if the inner ring 2 is pushed in to the innermost part side (the inner ring track center $O_2$ side) of the outer ring 1.

Further, to secure the product performance of the constant velocity joint, it is desirable that the radial clearance of the truck be from 0 to 1.5% of the track PCD and that the radial clearance between the outer ring 1 and the cage 4 be from 0 to 1.7% of the track PCD. If the percentages of these clearances increase, the radial clearance of the track increases, requiring that the axial clearance between the inner ring 2 and the cage 4 be also increased for play-elimination closing purposes. In the case where the joint rotates with high torque, the inner ring 2 moves toward the innermost part of the outer ring 1 because of the shape of the ball tracks. If the axial clearance between the inner ring 2 and the cage 4 is large, the outer spherical surface 2b of the inner ring 2 and the partial spherical surface 14a of the receiving member 14 interfere with each other before the outer spherical surface 2b of the inner ring 2 and the inner spherical surface 4c of the cage abut against each other. To avoid this, it is necessary that either the position of fixing between the receiving member 14 and the cage 4 be located in the innermost part of the outer ring 1 or the attaching section 14b of the receiving member 14 be increased in diameter and the inner surface concave section of the partial spherical surface 14a of the receiving member 14 be enlarged. This makes it possible to avoid drawbacks, such as a lowering in strength due to decreased wall thickness of the cage 4 in the fixing section between the attaching section 14b of the receiving member 14 and the cage 4, and a lowering in life due to the groove depth decrease of the outer ring track grooves 1a accompanying the increases in diameter of the cage outer spherical surface 4b and outer ring inner spherical surface 1b intended to compensate for the above-mentioned cage wall thickness decrease.

Further, in order to secure the shape of the fixed type constant velocity joint, it is desirable that the ratio of the track PCD to the torque transmitting ball be from 1.5 to 4.0. If this ratio is less than 1.5, the strength of the inner ring 2 lowers, and reversely, if it is greater than 4.0, there is the disadvantage that not only does the strength of the cage 4 lower but also the outer diameter of the outer ring 1 increases.

The fixed type constant velocity joint for steering purposes disclosed in Japanese unexamined Patent publication 2003-130082 has a preloading means installed therein, thereby eliminating track clearances which form a main factor in producing a play in the direction of rotation, thus mitigating degradation of steerability and abnormal sound production. Referring to FIG. 1, however, in the case where torque is not applied in the direction of rotation of the shaft, for structural reasons, the inner ring 2 and cage 4 are pushed out to the opening side of the outer ring 1 (the outer ring track center $O_1$ side). The cage 4 is axially displaced to the position where the inner spherical surface 1b of the outer ring 1 and the outer spherical surface 4b of the cage 4 abut against each other, while the inner ring 2 is axially displaced to the position where track clearances disappear. At this time, if the axial clearance between the inner ring 2 and the cage 4 is not greater than the amount by which the inner ring 2 is axially displaced due to the track clearances, play-elimination closing cannot be effected. On the other hand, in the case where a large torque in the direction of rotation of the shaft 5 is applied, the inner ring 2 is axially displaced to the position where the cage inner spherical surface 4c on the outer ring innermost part side and the inner ring outer spherical surface 2b abut against each other, with the outer ring inner spherical surface 1b on the opening side (the outer ring track center $O_1$ side) of the outer ring 1 and the cage outer spherical surface 4b being held abutting against each other as in the usual BJ. In this manner, irrespective of the presence or absence of torque load, the positional relation of the various structural parts is stabilized during the rotational operation, so that even if a working angle θ deg is taken, the torque transmitting balls 3 control the cage 4 to the position θ/2 deg, providing stabilized rotational operability.

Figure 17:
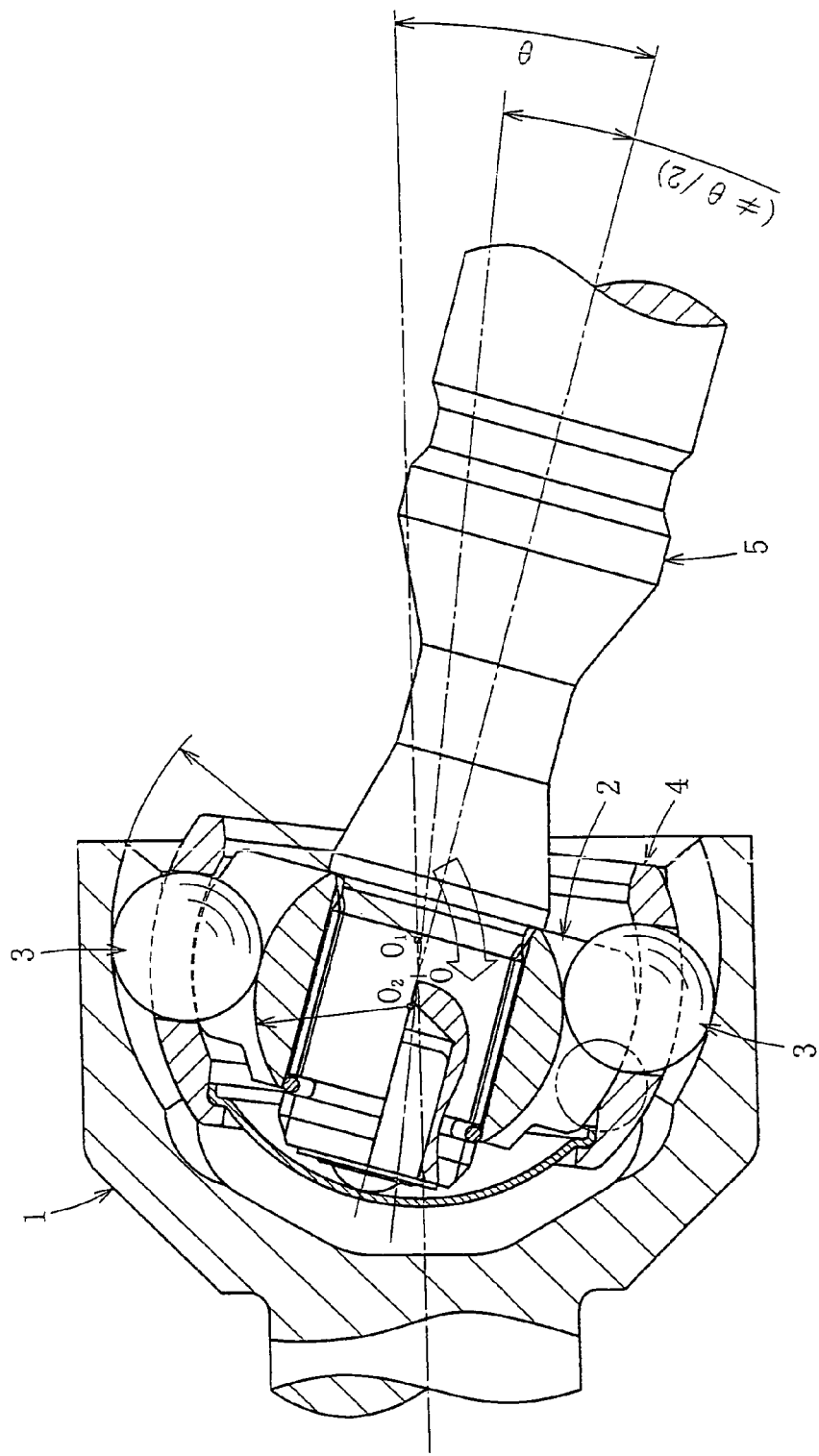
FIG. 17 is a longitudinal sectional view, showing the state of the cross operation of the joint of FIG. 16.
Figure 18:
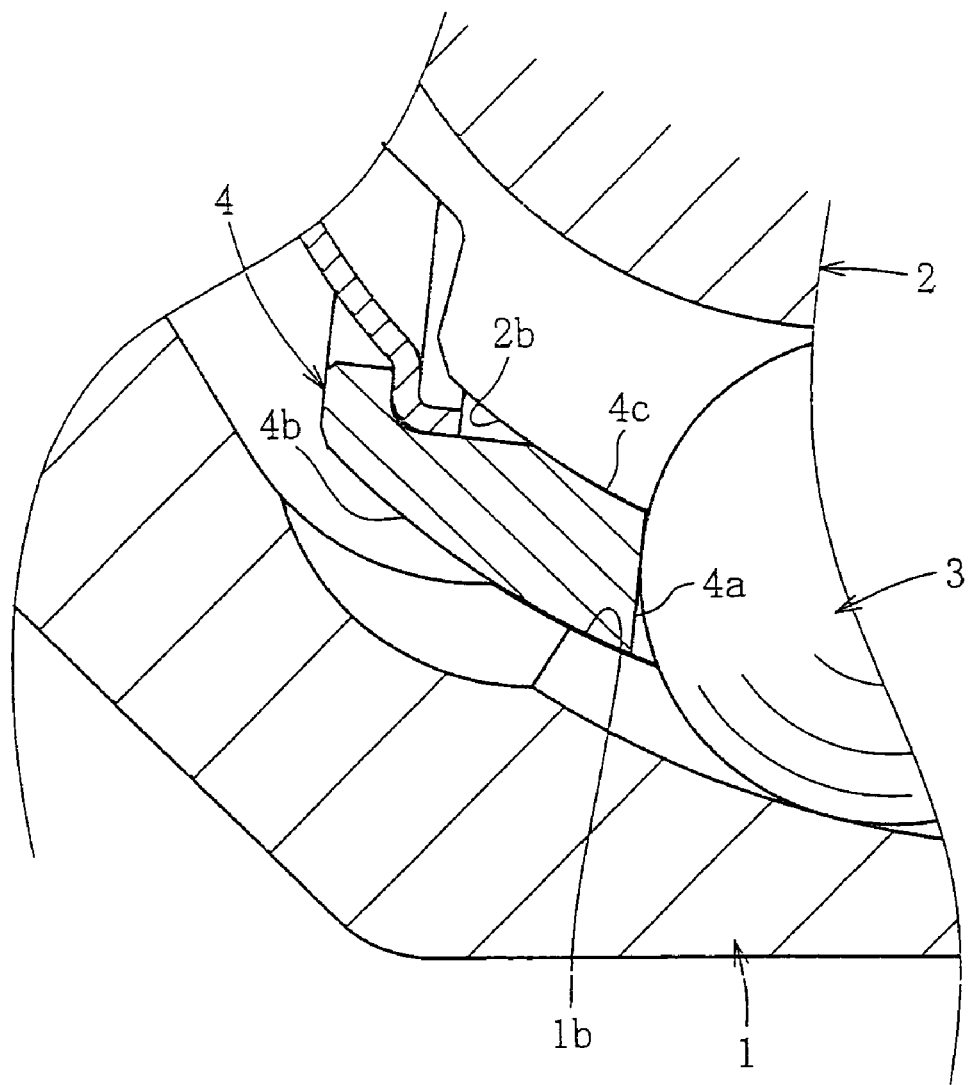
FIG. 18 is an enlarged view of the portion surrounded by an alternate long and two short dashes line in FIG. 17.

In contrast therewith, as shown in FIG. 17, the cross operation in the no-load state (in which the shaft 5 is bent in the direction of the working angle with the outer ring 1 fixed in position), unlike the rotational operation, is such that for structural reasons, the torque transmitting balls 3 cannot stably control the cage 4 to the position of θ/2 deg even if the shaft 5 is bent by θ deg, with the result that the inner ring 2 is pushed in to the innermost part side (the inner ring track center $O_2$ side) of the outer ring 1. Thereby, as shown in FIG. 18, the outer spherical surface 2b of the inner ring 2 and the inner spherical surface 4c of the cage 4 interfere with each other, the interference appearing as a hitch during the cross operation. In the case of a fixed type constant velocity joint for steering devices, the operations of tilt-up and tilt-down in tilt steering cannot be smoothly performed, resulting in inoperability under certain circumstances.

Figure 16:
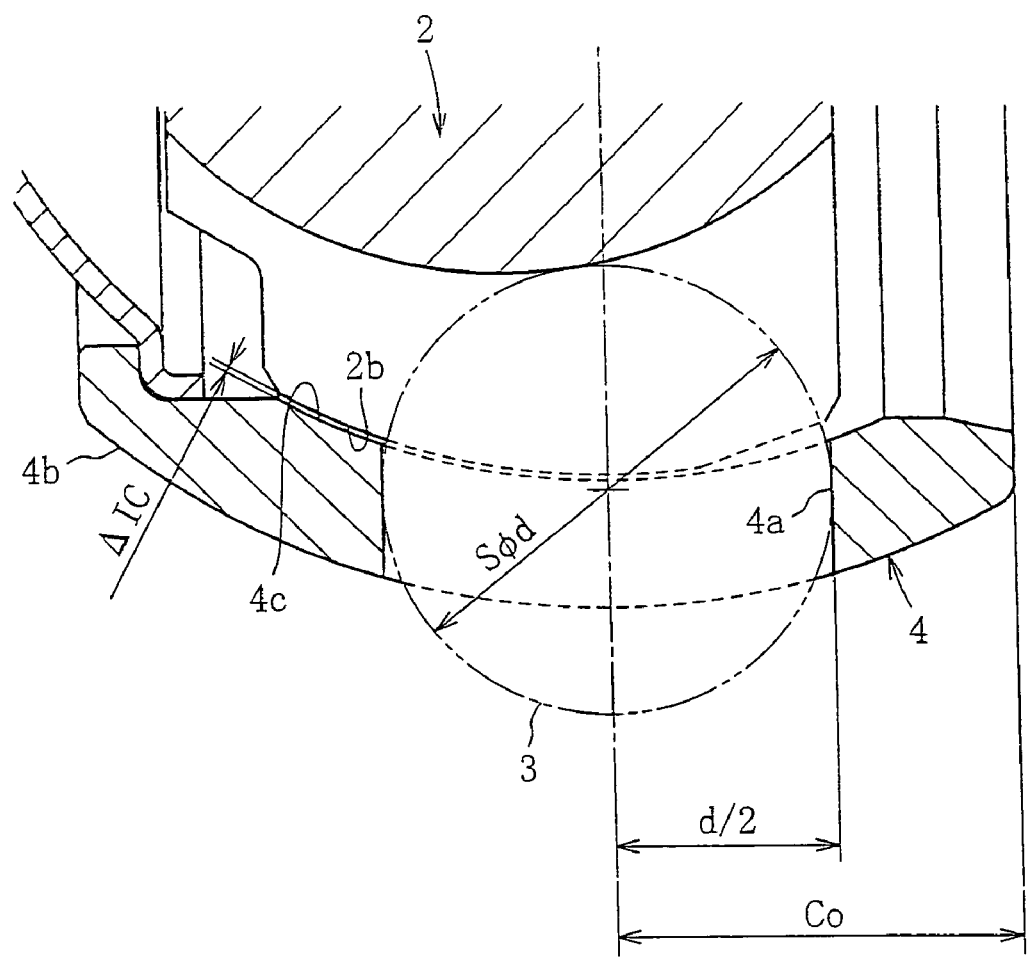
FIG. 16 is a partial longitudinal sectional view of a fixed type constant velocity joint, showing the prior art.
Figure 19:
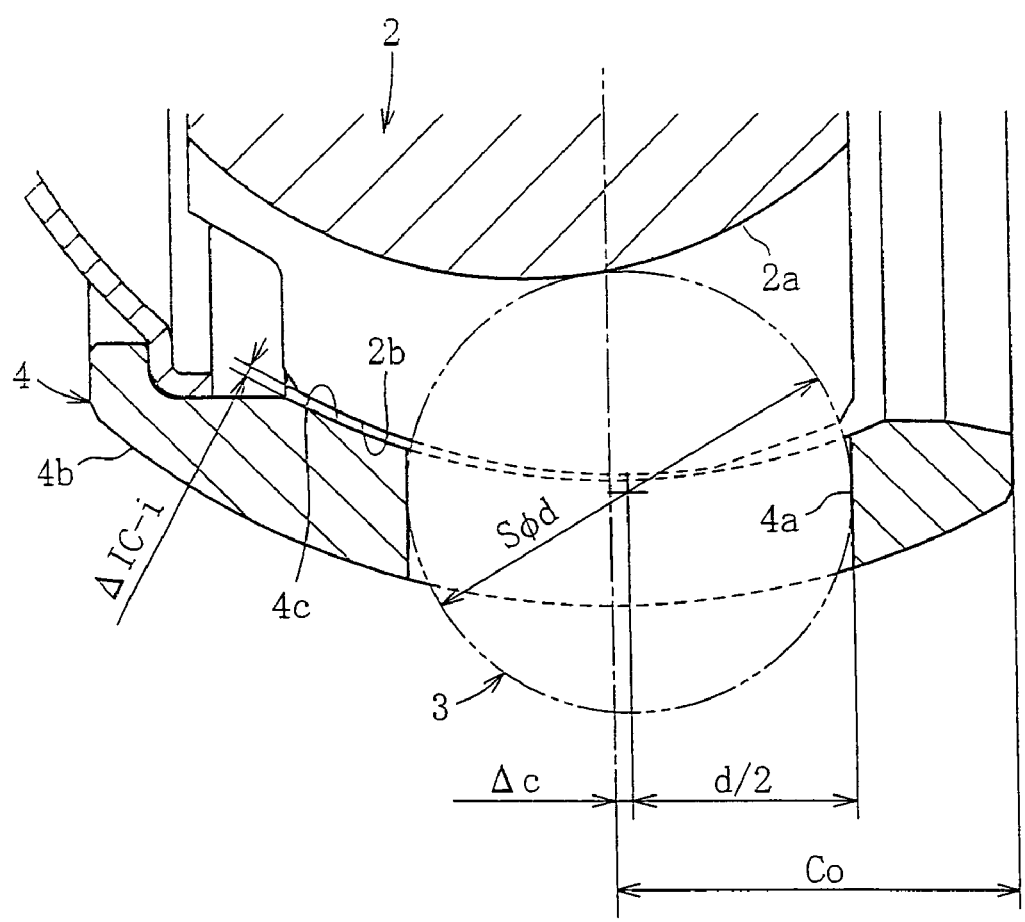
FIG. 19 is a partial enlarged view of the fixed type constant velocity joint of FIG. 1, showing another embodiment of the invention.
Figure 20:
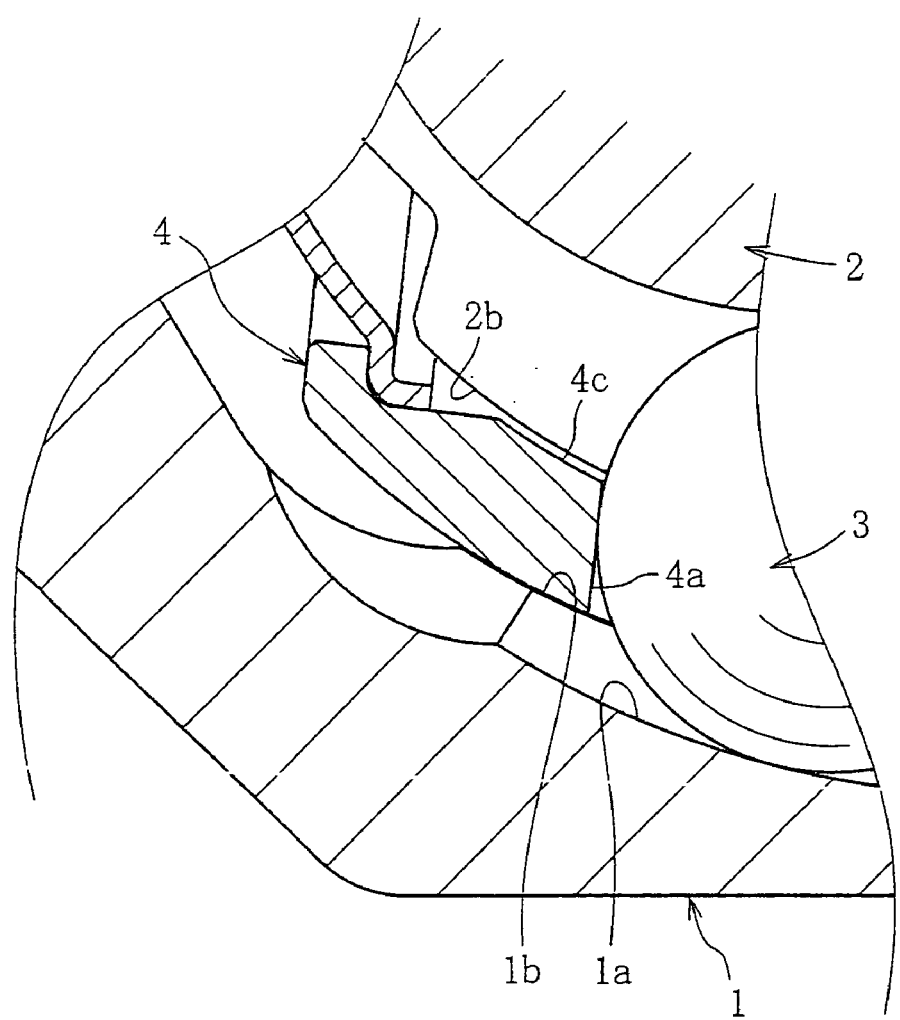
FIG. 20 is a partial enlarged view of FIG. 19 corresponding to FIG. 18.

As shown in FIG. 16, the position of the pocket 4a of the cage 4 has been basically such that in order to ensure coincidence between the central positions of the inner and outer spherical surfaces 4b and 4c of the cage 4 and the central position of the torque transmitting ball 3, excluding the case where a contact section between the pocket 4a and the torque transmitting ball 3 is not secured during the high angle, the position of the centers of the inner and outer spherical surfaces 4b and 4c of the cage 4 and the pocket 4a of the cage 4 is half the diameter d of the torque transmitting ball 3 (d/2). For this reason, the radial clearance between the inner ring 2 and the cage 4 is (spherical surface clearance)/2. On the other hand, as shown by the character Δc in FIG. 19, shifting the position of the pocket 4a of the cage 4 to the outer ring opening side (the outer ring track center $O_1$ side) with respect to the centers of the inner and outer spherical surfaces 4b and 4c (the position of the distance $C_O$ from the end surface) results in the clearance between the inner ring 2 and the cage 4 on the outer ring innermost part side being increased by an amount corresponding to the radial clearance and the amount of shift of the pocket position of the cage 4. This is indicated by the difference between the clearance ΔIC-i in FIG. 19 and the clearance ΔIC in FIG. 16. FIG. 20 is a view corresponding to FIG. 18, showing the prior art. As is clear from a comparison between the two figures, whereas in the case of FIG. 18 the inner ring outer spherical surface 2b and the cage inner spherical surface 4c abut against each other on the outer ring innermost part side, in the case of FIG. 20 there is a clearance between the two, 2b and 4c. Therefore, the inconveniences including a hitch during the cross operation and hence locking are eliminated.

INDUSTRIAL APPLICABILITY

Figure 21:
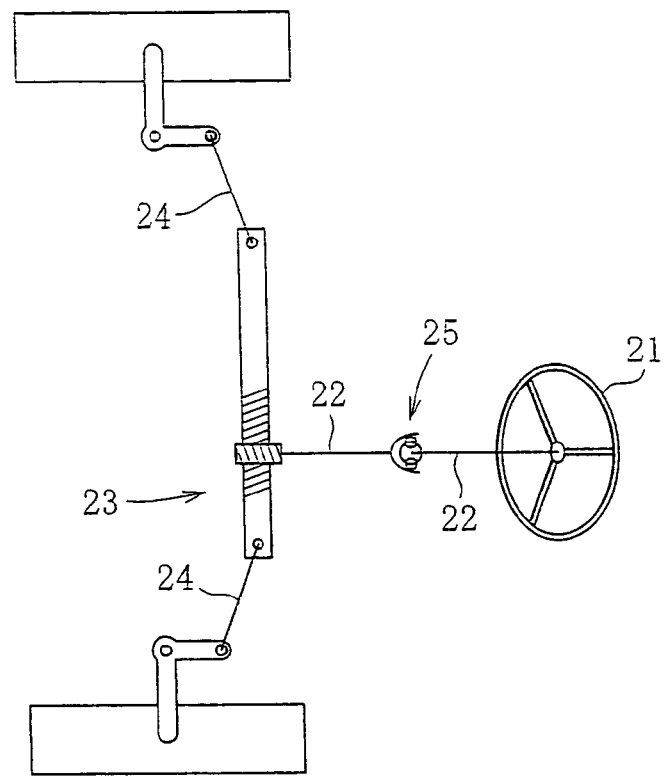
FIG. 21 is a schematic plan view of a steering device.
Figure 22:
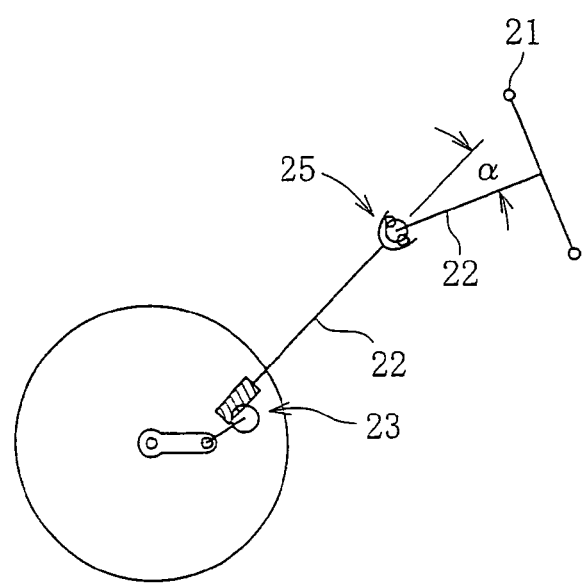
FIG. 22 is a schematic side view of a steering device.

The fixed type constant velocity joint of the invention is suitable in applications where rotation backlash must be suppressed as in steering shaft couplings for automobiles. FIGS. 21 and 22 show an example of a steering device. This steering device transmits the rotation of steering wheel 21 to a steering gear 23 through a steering column consisting of one or a plurality of steering shafts 22, thereby converting it into the reciprocation of a tie rod 24. In the case where the steering shaft 22 cannot be disposed in a straight line by reason of balance with on-vehicle space and the like, one or a plurality of universal joints 25 are interposed between the steering shafts 22, thereby ensuring that correct rotation can be transmitted to the steering gear 23 even in the state in which the steering shafts 22 are bent. A fixed type constant velocity joint may be used as this universal joint 25. The character α in FIG. 22 denotes the bending angle of the joint. Large angles with the bending angle α exceeding 30° may be set. In addition, the steering device may be an electric power steering device (EPS) adapted to impart auxiliary force by a motor or a hydraulic type power steering device.

The invention claimed is:

1. A fixed type constant velocity joint comprising:
  an outer member having an inner diameter surface formed with a plurality of track grooves;
  an inner member having an outer diameter surface formed with a plurality of track grooves;
  balls disposed in wedge-shaped ball tracks defined by the track grooves of the outer and inner members;
  a cage disposed between the inner diameter surface of the outer member and the outer diameter surface of the inner member for rotatably holding the balls; and
  a preloading mechanism in which either a pressing section for applying an elastic pressing force in an axial direction of the joint or a receiving section for receiving the pressing force from the pressing section is disposed in the cage, the other of the pressing section and the receiving section being disposed in the inner member, wherein a clearance between the inner member and the cage in the axial direction of the joint is greater than a clearance between the track grooves of the inner and outer members and the balls in the axial direction of the joint, and is 2.5-6.5 times as large as a track clearance between the track grooves of the inner and outer members and the balls in a radial direction of the joint.

2. A fixed type constant velocity joint as set forth in claim 1, wherein the outer diameter surface of the inner member is formed with a chamfered section serving as a relief which avoids interference with the inner diameter surface of the cage.

3. A fixed type constant velocity joint as set forth in claim 2, wherein the inner diameter surface of the cage is shaped as an aspherical surface which suppresses interference with the outer diameter surface of the inner member.

4. A fixed type constant velocity joint as set forth in claim 1, wherein the inner diameter surface of the cage is shaped as an aspherical surface which suppresses interference with the outer diameter surface of the inner member.

5. A fixed type constant velocity joint as set forth in claim 1, wherein the fixed type constant velocity joint is used for an automobile steering device.

6. A fixed type constant velocity joint comprising;
an outer ring having an inner spherical surface formed with a plurality of track grooves;
an inner ring having an outer spherical surface formed with a plurality of track grooves;
wedge-shaped ball tracks each defined by an outer ring track groove and an inner ring track groove, which form a pair, the wedge-shaped ball tracks each being reduced in size from one end to another end in an axial direction of the joint;
torque transmitting balls arranged in the wedge-shaped ball tracks, respectively; and
a cage having pockets for holding the torque transmitting balls, the cage being interposed between the inner spherical surface of the outer ring and the outer spherical surface of the inner ring, wherein a center of curvature of the track grooves of the outer ring and a center of curvature of the track grooves of the inner ring are offset from a center of the joint by a same distance to opposite sides of the center of the joint, and wherein a position of the pockets of the cage with respect to an axial direction of the cage is offset from a center of curvature of the cage toward an outer side of the track grooves of the outer ring.

7. A fixed type constant velocity joint as set forth in claim 6, wherein the amount of offset of the position of the pockets of the cage with respect to the axial direction of the cage is from 1.0 to 3.0% of an amount of offset of the track grooves.

8. A fixed type constant velocity joint as set forth in claim 7, wherein a preloading mechanism is installed between the inner ring and the cage to provide a construction for closing track clearances, and wherein a clearance is formed between an inner spherical surface of the cage and the outer spherical surface of the inner ring in no-load state.

9. A fixed type constant velocity joint as set forth in claim 8, wherein a difference between a dimension of the pockets of the cage in the axial direction of the cage and a diameter of the torque transmitting balls is in the range from 0 to 30 μm.

10. A fixed type constant velocity joint as set forth in claim 8, wherein the outer spherical surface of the inner ring is formed with a chamfered section serving as a relief which avoids interference with the inner spherical surface of the cage.

11. A fixed type constant velocity joint as set forth in claim 7, wherein a difference between a dimension of the pockets of the cage in the axial direction of the cage and a diameter of the torque transmitting balls is in the range from 0 to 30 μm.

12. A fixed type constant velocity joint as set forth in claim 7, wherein the outer spherical surface of the inner ring is formed with a chamfered section serving as a relief which avoids interference with an inner spherical surface of the cage.

13. A fixed type constant velocity joint as set forth in claim 6, wherein a preloading mechanism is installed between the inner ring and the cage to provide a construction for closing track clearances, and wherein a clearance is formed between an inner spherical surface of the cage and the outer spherical surface of the inner ring in no-load state.

14. A fixed type constant velocity joint as set forth in claim 13, wherein a difference between a dimension of the pockets of the cage in the axial direction of the cage and a diameter of the torque transmitting balls is in the range from 0 to 30 μm.

15. A fixed type constant velocity joint as set forth in claim 13, wherein the outer spherical surface of the inner ring is formed with a chamfered section serving as a relief which avoids interference with the inner spherical surface of the cage.

16. A fixed type constant velocity joint as set forth in claim 6, wherein a difference between a dimension of the pockets of the cage in the axial direction of the cage and a diameter of the torque transmitting balls is in the range from 0 to 30 μm.

17. A fixed type constant velocity joint as set forth in claim 16 wherein the outer spherical surface of the inner ring is formed with a chamfered section serving as a relief which avoids interference with an inner spherical surface of the cage.

18. A fixed type constant velocity joint as set forth in claim 6, wherein the outer diameter surface of the inner ring is formed with a chamfered section serving as a relief which avoids interference with an inner spherical surface of the cage.

19. A fixed type constant velocity joint as set forth in claim 6, wherein an inner spherical surface of the cage is shaped as an aspherical surface which suppresses interference with the outer spherical surface of the inner ring.

20. A fixed type constant velocity joint as set forth in claim 6, wherein the fixed type constant velocity joint is used for an automobile steering device.

* * * * *